(12) United States Patent  
Pan et al.

(10) Patent No.: US 7,570,596 B2  
(45) Date of Patent: Aug. 4, 2009

(54) METHOD AND APPARATUS FOR EVALUATING PERFORMANCE OF WIRELESS LAN SYSTEM

(75) Inventors: Huanxu Pan, Minato-ku (JP); Shohei Sato, Minato-ku (JP); Kazutomo Kobayashi, Minato-ku (JP); Takashi Shiraki, Minato-ku (JP)

(73) Assignee: NEC Corporation, Tokyo (JP)

( * ) Notice: Subject to any disclaimer, the term of this patent is extended or adjusted under 35 U.S.C. 154(b) by 525 days.

(21) Appl. No.: 11/283,850

(22) Filed: Nov. 22, 2005

(65) Prior Publication Data

US 2006/0133293 A1 Jun. 22, 2006

Related U.S. Application Data

(63) Continuation-in-part of application No. 10/901,242, filed on Jul. 29, 2004, now abandoned.

(30) Foreign Application Priority Data

Dec. 25, 2003 (JP) ............................. 2003-430571  
Nov. 22, 2004 (JP) ............................. 2004-337308

(51) Int. Cl.
*H04J 3/14* (2006.01)
*H04W 4/00* (2006.01)
*G06F 17/50* (2006.01)
*G06G 7/62* (2006.01)

(52) U.S. Cl. ........................ 370/241; 370/338; 703/13

(58) Field of Classification Search ................. 370/241, 370/242, 338; 703/13  
See application file for complete search history.

(56) References Cited

U.S. PATENT DOCUMENTS

2001/0026539 A1* 10/2001 Kornprobst et al. .......... 370/329

(Continued)

FOREIGN PATENT DOCUMENTS

JP 5-120177 A 5/1993

(Continued)

OTHER PUBLICATIONS

G. Bianchi, "Performance Analysis of IEEE 802.11 Distributed Coordination Function," IEEE Journal on Selected Areas in Communications, vol. 18, No. 3, pp. 535-547, 2000.

(Continued)

*Primary Examiner*—Kevin C Harper  
(74) *Attorney, Agent, or Firm*—Sughrue Mion, PLLC

(57) ABSTRACT

A method for evaluating the performance of a wireless LAN (local area network) system having a single access point and a plurality of transmission terminals, which share the same radio channel, comprises the steps of dividing the plurality of transmission terminals into groups in accordance with radio conditions, calculating a transmission probability and a post-transmission failure probability for each group using a transmission rate, an error rate, and the number of terminals of each group, and calculating a throughput based on the transmission probability and post-transmission failure probability. A characteristic value for packet transmission delay may also be calculated based on the transmission probability and post-transmission failure probability. According to this method, the performance such as the throughput and the packet transmission delay can be evaluated in a wireless LAN system even before the wireless LAN system is constructed.

23 Claims, 6 Drawing Sheets

U.S. PATENT DOCUMENTS

2002/0071445 A1* 6/2002 Wu et al. .................... 370/441
2004/0236547 A1* 11/2004 Rappaport et al. ............. 703/2

FOREIGN PATENT DOCUMENTS

| JP | 2000-115196 A | 4/2000 |
| --- | --- | --- |
| JP | 2001-168904 A | 6/2001 |
| JP | 2001-518765 A | 10/2001 |
| JP | 2002-198975 A | 7/2002 |
| JP | 2002-530956 A | 9/2002 |
| JP | 2003-51781 A | 2/2003 |

OTHER PUBLICATIONS

A Doufexi, S. Armour, M. Buler, A. Nix, D. Bull, J. McGeehan, and P. Karisson, "A comparison of HIPERLAN/2 and IEEE 802.11a Wireless LAN standards," IEEE Communications Magazine, vol. 40, No. 5, pp. 172-180, 2002.

IEEE Std. 802.1, "Part 11: Wireless LAN Medium Access Control (MAC) and Physical Layer (PHY) Specifications," pp. 71-87, 1997.

H. Pan, S. Sato, and K. Kobayashi, "On the Throughput of an IEEE 802.11a Wireless LAN System with Terminals under Heterogeneous Radio Conditions," Proceedings of the 18th International Teletraffic Congress, 2003.

Huanxu Pan, Shohei Sato, and Kazutomo Kobayashi, "Evaluation on Throughput of Wireless LAN in Consideration of Packet Collisions," the Institute of Electronics, Information and Communication Engineers (Japan), 2003 Society Conference Proceedings, SB-6-5, 2003.

Recommendation ITU-R P.1238-2, "Propagation Data and Prediction Methods for the Planning of Indoor Radiocommunication Systems and Radio Local Area Networks in the Frequency Range 900 MHz to 100 GHz," 2001.

* cited by examiner

METHOD AND APPARATUS FOR EVALUATING PERFORMANCE OF WIRELESS LAN SYSTEM

CROSS REFERENCE TO RELATED APPLICATION

The present application is a continuation-in-part of application Ser. No. 10/901,242 filed on Jul. 29, 2004 now abandoned.

BACKGROUND OF THE INVENTION

1. Field of the Invention

The present invention relates to a method and apparatus for evaluating the performance of a wireless LAN (local area network) system, and more particularly, to a performance evaluation method and apparatus which can predict the throughput and the like of a wireless LAN system even before the wireless LAN system is constructed.

2. Description of the Related Art

With the proliferation of wireless LANs, a need exists for techniques for evaluating the performance, for example, the throughput and the like, of wireless LANs. The wireless LAN suffers from a lower throughput due to errors on a radio transmission, i.e., errors on a physical layer caused by the use of the space as a transmission medium, and collisions resulting from simultaneous transmissions started on the MAC (Medium Access Control) layer, attempted by a plurality of terminals. Errors on the radio transmission include, for example, those caused by radio interference, extraneous noise, and the like.

To address this problem, there is a higher need for evaluating the performance, particularly, the throughput of wireless LANs than wired LANs.

In a VoWLAN (Voice over Wireless LAN) system in which voice communications are established using a wireless LAN, packet transmission delay affects voice quality, and evaluation of the packet transmission delay is also important. The packet transmission delay is a deferment time until transmission of a packet is successfully completed when a terminal or an access point transmits the packet. The deferment time includes a channel competition time against other terminals and access points, and a re-transmission time due to a failure in transmission.

The performance of a wireless LAN may be evaluated by measuring the throughput and the like in the actual wireless LAN using a measuring instrument. However, this measurement-based approach disadvantageously encounters difficulties in providing conclusive results because this approach can be applied only to existing wireless LAN systems, and because performance values such as the throughput can largely vary depending on particular situations in which a wireless LAN is used. Taking into consideration the time and cost required to construct a wireless LAN system, the performance should be in many cases evaluated prior to the construction of the wireless LAN system rather than ex-post measurements made on the performance of the constructed wireless LAN system. For such a situation, the performance can be effectively evaluated by mathematical approaches or simulations.

For example, a performance evaluation approach based on a collision probability analysis in a wireless LAN has been proposed in G. Bianchi, "Performance Analysis of IEEE 802.11 Distributed Coordination Function," IEEE Journal on Selected Areas in Communications, Vol. 18, No. 3, pp. 535-547, 2000. However, this approach makes an analysis premised on ideal radio channel conditions without transmission errors, thereby implying a problem that it provides evaluations too optimistic for actual systems.

Also, as described in A. Doufexi, S. Armour, M. Buler, A. Nix, D. Bull, J. McGeehan, and P. Karisson, "A comparison of HIPERLAN/2 and IEEE 802.11a Wireless LAN standards," IEEE Communications Magazine, Vol. 40, No. 5, pp. 172-180, 2002, an approach evaluates the influence exerted by transmission errors to the throughput, intended only for a single transmission/reception pair in consideration of radio conditions in the physical layer. However, this evaluation is based on a simple approach which involves subtracting an overhead as defined by the transmission standard, and a portion multiplied by an error ratio from a transmission rate as defined by the physical standard. Therefore, this approach is incapable of evaluating the influence on wireless LAN performance values such as the throughput exerted by collisions when there are a plurality of communication terminals.

Japanese Patent Laid-open Application No. 2001-168904 (JP, P2001-168904A) discloses a method of simulating the performance of a wireless LAN, which involves generating packets in accordance with a probability distribution, regarding some of generated packets as lost packets, and processing the remaining packets using a discrete event simulation to evaluate the throughput. JP, P2001-168904A, however, does not disclose how a simulation should be executed when a specific terminal topology is given.

PCT International Publication Pamphlet No. WO 00/30384 discloses a method of predicting a radio condition in a CDMA (code division multiple access) based mobile communication system when positional information on radio stations are given. This method, however, supports a prediction of errors in a physical layer, so called in the LAN, and therefore does not take into consideration collisions of transmissions on the MAC layer, so that this method, as it is, cannot be applied to evaluation on the performance of wireless LAN.

As described above, there is no method for evaluating the throughput, packet transmission delay or the like of a wireless LAN before construction of the wireless LAN. Such an evaluation method should take into consideration both transmission errors and collisions of transmissions, and could make an accurate evaluation when a specific terminal topology is given.

SUMMARY OF THE INVENTION

It is an object of the present invention to provide a method and apparatus which are capable of accurately evaluating the performance of a wireless LAN system in consideration of a transmission collision probability among a plurality of terminals, and a transmission/reception error rate or error probability associated with radio conditions of the respective terminals.

A method of the present invention is provided for evaluating the performance of a wireless LAN system having a single access point and a plurality of transmission terminals, wherein the access point and the transmission terminals share the same radio channel. The method includes the steps of dividing the plurality of transmission terminals into groups depending on radio conditions, and calculating a transmission probability and a post-transmission failure probability for each group using a transmission rate, an error rate, and the number of terminals of the each group. Preferably, in the present invention, the method further includes the step of calculating a throughput and/or a characteristic value about packet transmission delay, based on the transmission probability and post-transmission failure probability. A distribution of the packet transmission delay, an average of the delay or the like may be used as the characteristic value about the packet transmission delay.

Specifically, in the present invention, once a transmission rate and an error rate of each terminal, and the number of terminals belonging to a group are entered for each group, the method calculates the probability of transmission success/failure, when each terminal is continuously transmitting, in accordance with a predetermined calculation algorithm. Then, the method calculates performance values such as the throughput of each terminal and the overall system, and a value representing the packet transmission delay, and displays the result of the calculation.

An apparatus of the present invention is provided for evaluating the performance of a wireless LAN system having a single access point and a plurality of transmission terminals, where the access point and the transmission terminals share the same radio channel. The apparatus includes means for entering a transmission rate, an error rate, and the number of terminals of each of groups into which the plurality of transmission terminals are divided in accordance with radio conditions, and means for calculating a transmission probability and a post-transmission failure probability for each group using the transmission rate, the error rate, and the number of terminals of each group. The apparatus of the present invention may further include throughput calculating means for calculating a throughput based on the transmission probability and post-transmission failure probability. The apparatus of the present invention may further include means for calculating, based on the transmission probability and post-transmission failure probability, a characteristic value about packet transmission delay.

According to the present invention, the performance of a wireless LAN system can be readily found even before the construction of the wireless LAN system. Thus, the present invention significantly contributes to efficient system performance designing.

The above and other objects, features, and advantages of the present invention will become apparent from the following description with reference to the accompanying drawings which illustrate examples of the present invention.

DETAILED DESCRIPTION OF THE PREFERRED EMBODIMENTS

Figure 1:
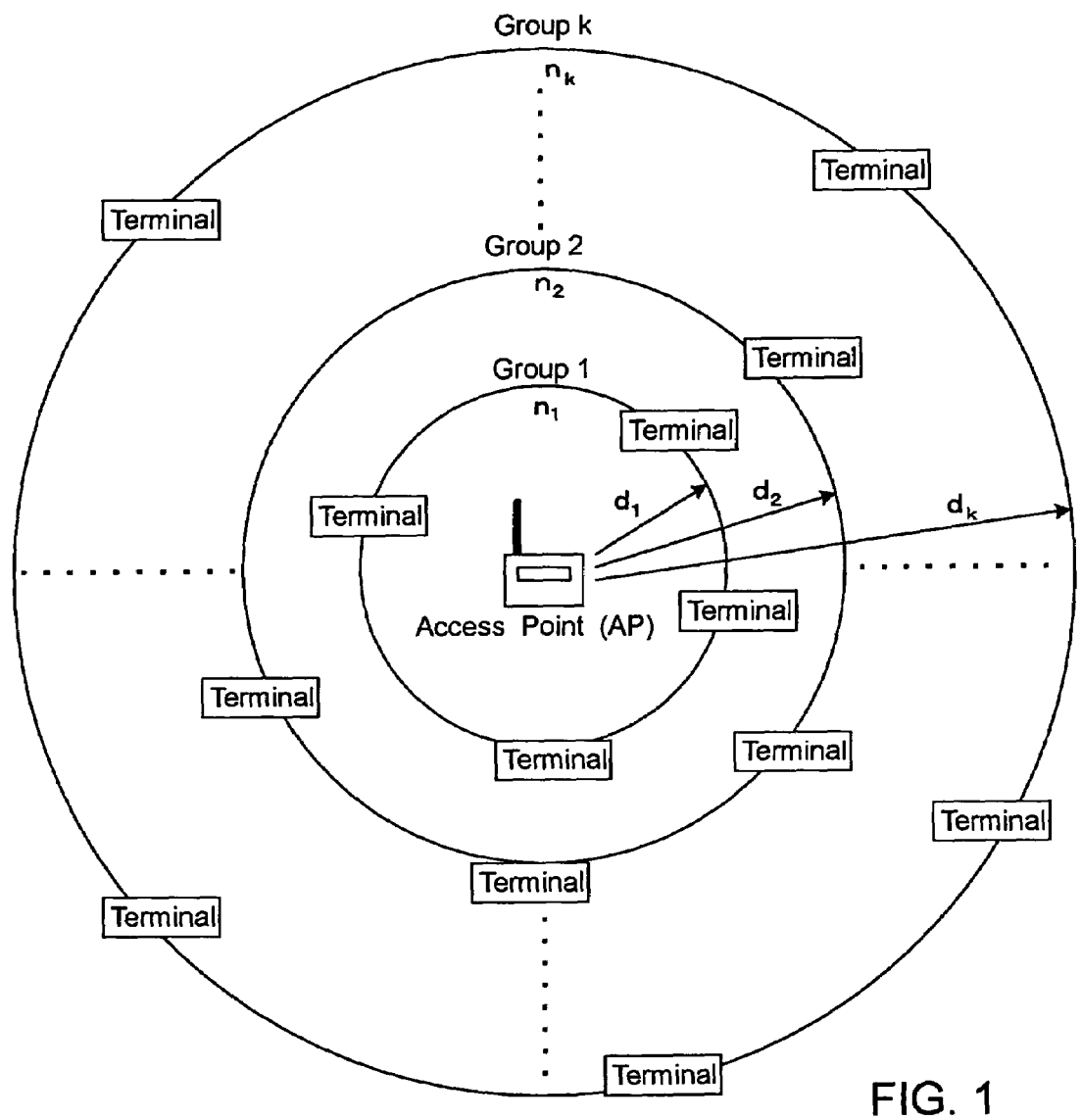
FIG. 1 is a diagram illustrating an exemplary topology of a wireless LAN system.

FIG. 1 illustrates the topology of a wireless LAN system which is subjected to an evaluation in a preferred embodiment of the present invention. Assume that in FIG. 1, the wireless LAN system comprises a single access point (AP) and a plurality of terminals for connection to the access point. In this wireless LAN system, all communications are made between the access point and terminals. A plurality of terminals are divided into K groups in accordance with radio conditions or the like, wherein terminals in each group have substantially the same radio conditions. As described later, the number of terminals belonging to group k ($1 \leq k \leq K$) is represented by $n_k$. For convenience of description, the access point is defined to belong to group 0. Therefore, $n_0=1$.

Figure 2:
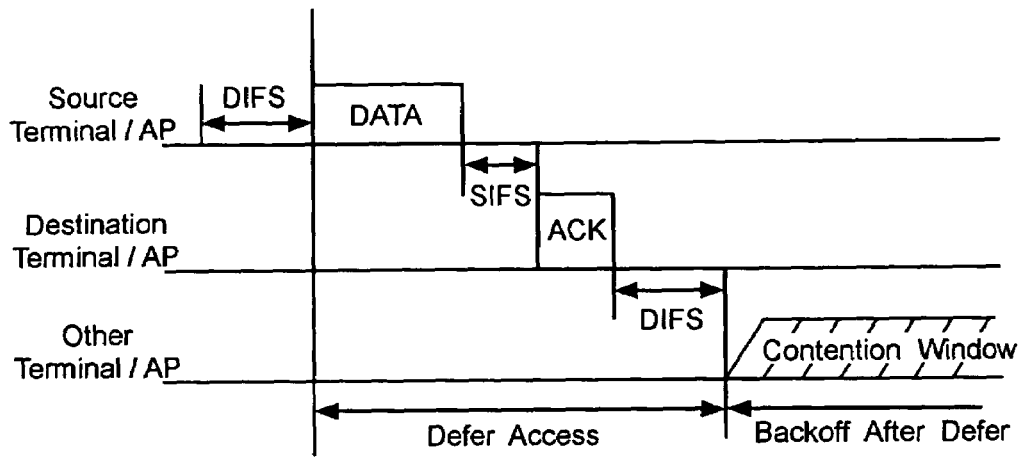
FIG. 2 is a diagram for describing an MAC layer protocol DCF according to IEEE 802.11 standard.

While the evaluation method according to the present invention can be applied to a variety of wireless LAN systems, the following description will be made on the evaluation method applied to a wireless LAN system based on IEEE 802.11 standard which implements a MAC layer protocol DCF (Distributed Coordination Function) basic scheme. The DCF basic scheme is based on CSMA (carrier sense multiple access)/CA (collision avoidance)+ACK (acknowledge), the mechanism of which is illustrated in FIG. 2. For details on the DCF basic scheme, see, for example, IEEE Std. 802.1, "Part 11: Wireless LAN Medium Access Control (MAC) and Physical Layer (PHY) Specifications," pp. 71-87, 1997. In the following, the DCF scheme will be described as the premise for describing embodiments of the present invention.

A terminal or the access point which has data to be transmitted first checks a (radio) channel state. The state of channel is represented by "busy" when at least one of terminal/access point is involved in transmission of data on the channel, and otherwise by "idle." The terminal or access point which attempts to transmit data, when sensing the channel as "idle," transmits one packet when a continued idle time exceeds a fixed time interval referred to as "DIFS" (DCF interframe space). The terminal or access point, when sensing the channel as "busy," first waits for DIFS after the channel becomes idle, and then waits for a random-length backoff period before it transmits data. If the channel again becomes busy before the end of DIFS, the foregoing process is repeated. If the channel becomes busy during a backoff period, a backoff timer is stopped until the end of next DIFS. When a transmitted packet is correctly received, an ACK packet is returned from a receiving terminal or access point for acknowledgement after an SIFS (short interface space) interval shorter than DIFS.

While a backoff length is calculated as (random number)× (basic slot length), where the random number follows a uniform distribution on a section [0, CW], where CW represents a window parameter. Window parameter CW is multiplied by two each time a transmission fails until a certain limited number of times m, as expressed by CW=[min($2^i$, $2^m$)]W−1, where i is the number of times a packet is re-transmitted, and W is a window size at the first transmission. While the foregoing parameters have values which vary in accordance with the standard of the physical layer, the slot length σ=9 μs, m=6, W=16 are defined in IEEE 802.11a standard which employs radio frequencies in a 5-GHz band.

As described above, in the DCF scheme, each transmission terminal or access point independently sets its backoff timer at random to reduce the probability of transmission collisions. Due to the random nature, it is not simple to solve the performance of the overall wireless LAN system as well as the performance of individual terminals and access point. In the G. Bianchi's article, a mathematical analysis on the DCF scheme is made to investigate the influence on the throughput depending on the number of transmission terminals and access points under error-free ideal radio conditions.

However, the ideal radio conditions are not established in actual wireless LAN systems which entail possible transmission errors. In addition, every terminal does not generally have homogeneous radio conditions. In other words, the respective terminals and access point differ from one another in transmission rate and error rate. Bearing the foregoing in mind, the present invention intends to evaluate the throughput and/or packet transmission delay of a wireless LAN system under such heterogeneous radio conditions. We have published the result of a throughput analysis which was made based on the throughput evaluation method according to the present invention in H. Pan, S. Sato, and K. Kobayashi, "On the Throughput of an IEEE 802.11a Wireless LAN System with Terminals under Heterogeneous Radio Conditions," Proceedings of the 18$^{th}$ International Teletraffic Congress, 2003, and Huanxu Pan, Shohei Sato, and Kazutomo Kobayashi, "Evaluation on Throughput of Wireless LAN in Consideration of Packet Collisions," the Institute of Electronics, Information and Communication Engineers (Japan), 2003 Society Conference Proceedings, SB-6-5, 2003.

Figure 3:
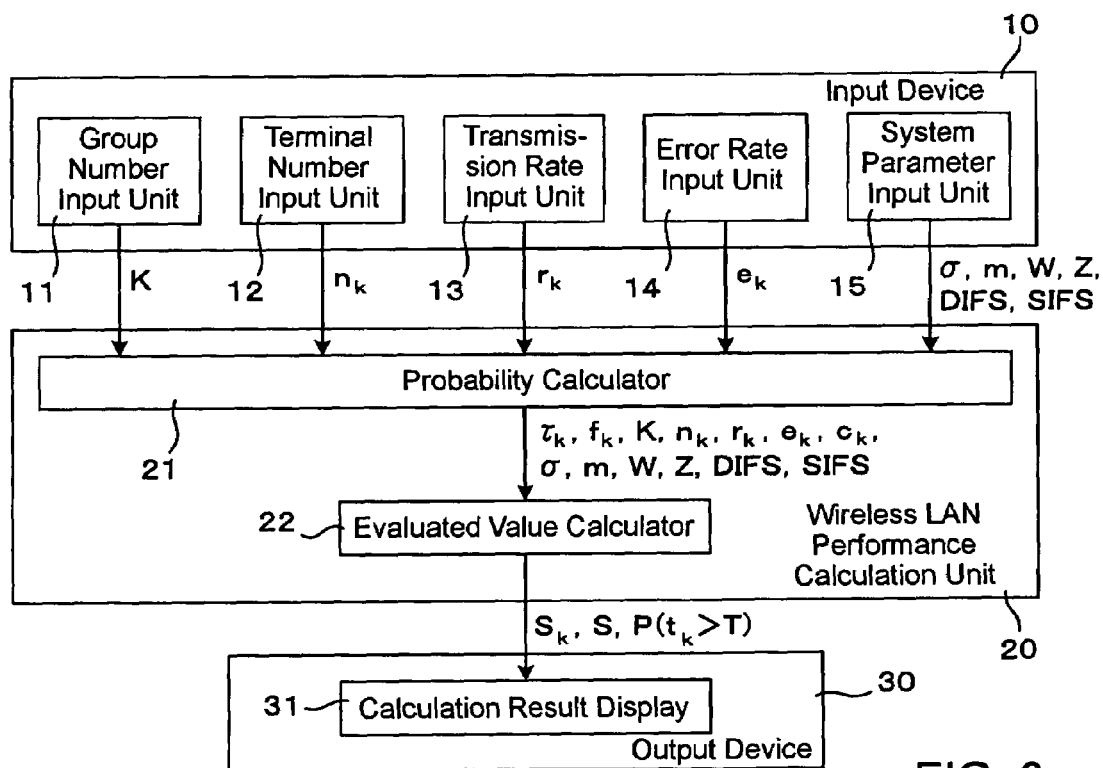
FIG. 3 is a block diagram illustrating the configuration of a wireless LAN evaluation apparatus according to one embodiment of the present invention.

FIG. 3 is a block diagram illustrating the configuration of a wireless LAN evaluation apparatus according to one embodiment of the present invention. The illustrated apparatus generally comprises input device 10, wireless LAN performance calculation unit 20, and output device 30. As input device 10 enters parameters, which reflects system conditions of a wireless LAN, into wireless LAN performance calculation unit 20, wireless LAN performance calculation unit 20 calculates a wireless LAN performance characteristic value such as the throughput and packet transmission delay distribution, and output device 30 displays the result of the calculation.

Input device 10 is provided for entering information on the number of terminals, information on the topology and the like related to the wireless LAN. Input device 10 has group number input unit 11 for entering the number K of terminal groups; terminal number input unit 12 for entering the number $n_k$ of terminals in each group, where k is a number representing a group; transmission rate input unit 13 and error rate input unit 14 for entering a radio environment in each group; and system parameter input unit 15 for entering system parameters <<σ, m, W, DIFS, SIFS, Z>> related to the wireless LAN standard, packet size, and the like. Transmission rate input unit 13 receives transmission rate $r_k$ of each group, while error rate input unit 14 receives error rate (i.e., error probability) $e_k$ for each group. These values and parameters entered into input device 10 are passed from input device 10 to wireless LAN performance calculation unit 20.

Wireless LAN performance calculation unit 20 comprises probability calculator 21 for calculating transmission probability $\tau_k$ of each terminal or access point in an arbitrary slot for each group based on a predetermined calculation algorithm, and failure probability $f_k$ in the event of transmission; and evaluated value calculator 22 for calculating throughput $S_k$ of each terminal or access point, throughput S of the overall system and packet transmission delay distribution $P(t_k>T)$ from the result of the probability evaluations. Packet transmission delay distribution $P(t_k>T)$ is probability of that packet transmission delay $t_k$ excesses predetermined level T. Wireless LAN performance calculation unit 20 calculates these throughput values and packet transmission delay excess probability which are passed to output device 30.

Output device 30 comprises calculation result display 31 for displaying the results of the calculations.

Next, the operation of the apparatus in this embodiment will be described. As mentioned above, in this embodiment, the wireless LAN system under evaluation is formed of a single access point and a plurality of terminals which share the same radio channel. The terminals are divided into K groups in accordance with radio conditions, where terminals belonging to the same group share the same radio conditions. In a general wireless LAN implementation, this means that terminals belonging to the same group have the same transmission rate and error rate. The error used herein refers to a transmission failure due to transmission errors caused by insufficient radiowave conditions. In contrast to this, there is another transmission failure caused by collisions resulting from simultaneous transmissions from a plurality of terminals and/or access point. In the following description, the terminals and access point are both called the "station" unless they need to be particularly distinguished from each other. Assume that all stations always have data to be transmitted.

Paying special attention to a particular station in group k, $c_k$ represents the probability that a packet transmitted from the station can encounter a collision, and $e_k$ represents the probability that the packet can corrupt, that is, the packet error rate (PER). Probability $c_k$ can be found by a mathematic analysis according to the present invention, while probability $e_k$ depends on signal-to-noise ratio $(C/N)_k$ and transmission rate $r_k$ which serve as indicia of the radio conditions. Also, $n_k$ designates the number of stations belonging to group k. Group 0 exclusively includes the access point, and $n_0=1$ because the wireless LAN system under evaluation has a single access point.

Figure 4:
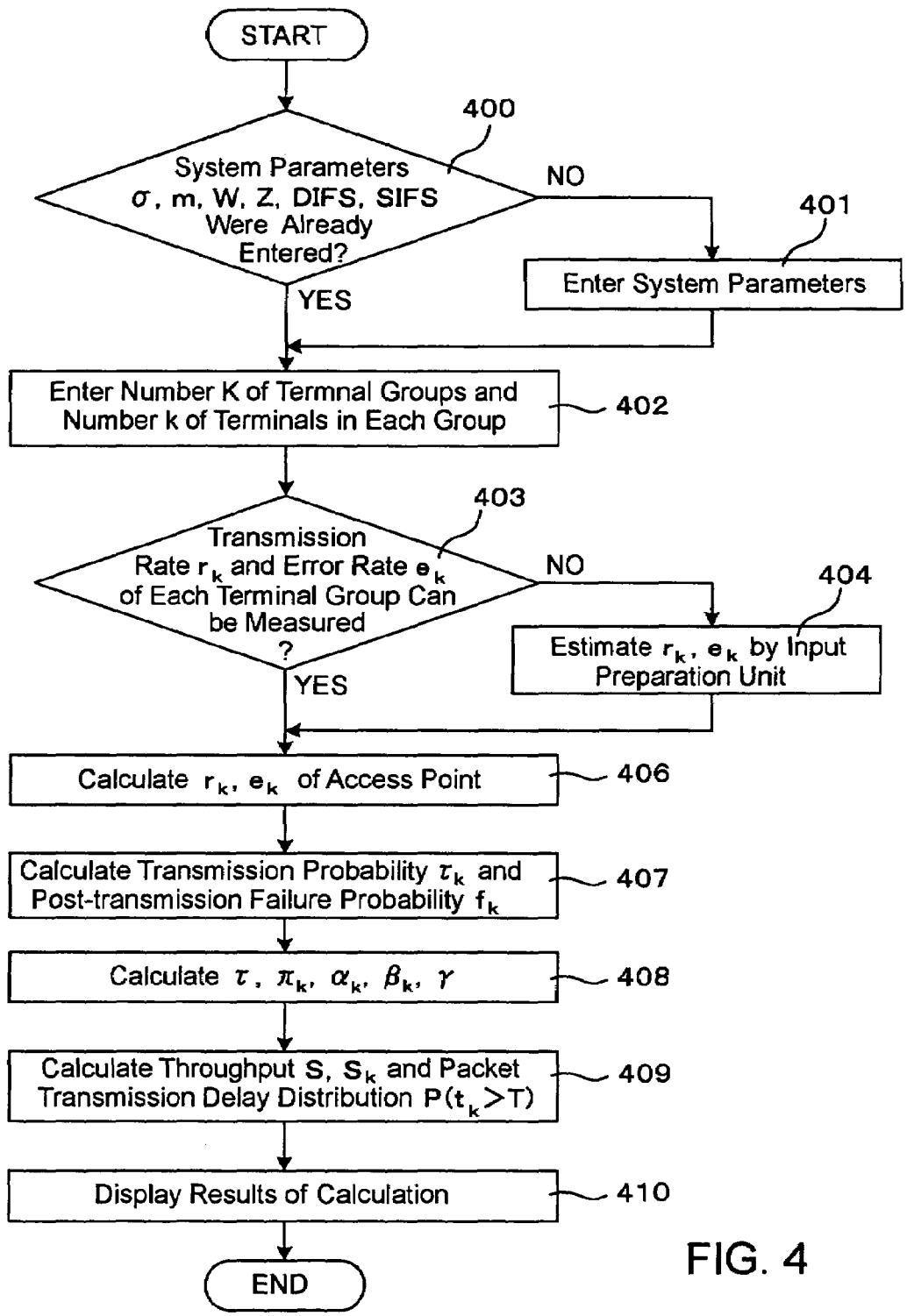
FIG. 4 is a flow chart illustrating a procedure for evaluating the throughput using the apparatus illustrated in FIG. 3.

FIG. 4 is a flow chart illustrating an operational procedure in this embodiment.

First, at step 400, it is determined whether or not a variety of parameters on the system standard, and a parameter for average packet size Z of transmission data have been entered. A variety of parameters on the system standards can be, for example, the aforementioned parameters σ, m, W, DIFS, SIFS, and the like. Many of these system parameters are common among different wireless LAN systems, and therefore can be reused for evaluating other wireless LAN systems, so that if they have been entered, they need not be entered again. If the system parameters have not been entered, these parameters are entered through input device 10 at step 410.

Next, at step 402, the number K of terminal groups, and the number $n_k(1 \leq k \leq K)$ of transmission terminals in each group are entered through input device 10. At step 403, it is determined whether or not parameters $(r_k, e_k)$ representative of the radio conditions of the wireless LAN system under evaluation can be applied directly from a measuring instrument or the like. If the parameters can be directly supplied, the procedure proceeds to step 405. If the parameters cannot be directly supplied, parameters $r_k, e_k$ are estimated at step 404, followed by transition of the procedure to step 405. At step 405, the peculiar parameter values $r_k, e_k$ $(1 \leq k \leq K)$ for the wireless LAN system are entered through input device 10.

Now, description will be made on how parameters $r_k, e_k$ are estimated at step 404. For accommodating parameters $r_k, e_k$ which cannot be directly supplied, the wireless LAN performance evaluation apparatus illustrated in FIG. 3 is provided with input preparation unit 50 for calculating parameters $r_k, e_k$ and supplying input device 10 with the calculated $r_k, e_k$. Input preparation unit 50 estimates parameters $r_k, e_k$ as illustrated in a flow chart of FIG. 5.

With a general radio measuring instrument used for measuring the parameters, if an access point alone has been installed in the system even without wireless LAN terminals, the measuring instrument can measure a signal-to-noise ratio (C/N)$_k$ on the assumption that wireless LAN terminals are installed. Therefore, input preparation unit 50 determines at step 500 whether or not radio condition (C/N)$_k$ can be measured for each terminal group k, and estimates parameters r$_k$, e$_k$ from the measured (C/N)$_k$ at step 502 when it can be measured. These parameters may be estimated as described in the aforementioned article by A. Doufexi et al.

On the other hand, there is no radio measuring instrument available for measuring the signal-to-noise ratio in the wireless LAN system, or when the access point has not even been installed at a preparatory stage in the construction of a wireless LAN system, input preparation unit 50 uses a radiowave propagation model (see, for example, Recommendation ITU-R P.1238-2, "Propagation Data and Prediction Methods for the Planning of Indoor Radiocommunication Systems and Radio Local Area Networks in the Frequency Range 900 MHz to 100 GHz," 2001) at step 501 to estimate (C/N)$_k$ from communication distance d$_k$ between the access point and each terminal belonging to each group in the wireless LAN system which is scheduled to be constructed. Then, at step 502, parameters r$_k$, e$_k$ are estimated from estimated (C/N)$_k$ in a similar manner to the foregoing.

Turning back to FIG. 4, after execution of step 405, probability calculator 21 calculates average transmission rate r$_0$ and error rate e$_0$ of the access point from the foregoing entered values in the following manner on the assumption that a transmission can be made from the access point to each terminal at uniform opportunity:

$$r_0 = \sum_{k=1}^{K} n_k \bigg/ \sum_{k=1}^{K} \frac{n_k}{r_k}, \quad e_0 = \sum_{k=1}^{K} n_k e_k \bigg/ \sum_{k=1}^{K} n_k \quad (1)$$

Average transmission rate r$_0$ thus calculated represents an average rate for a transmission of data in a fixed size. The probability of post-transmission failure (error or collision) at a particular station in group k, designated by f$_k$, is expressed by:

$$f_k = c_k + (1-c_k)e_k, 0 \leq k \leq K \quad (2)$$

Figure 6:
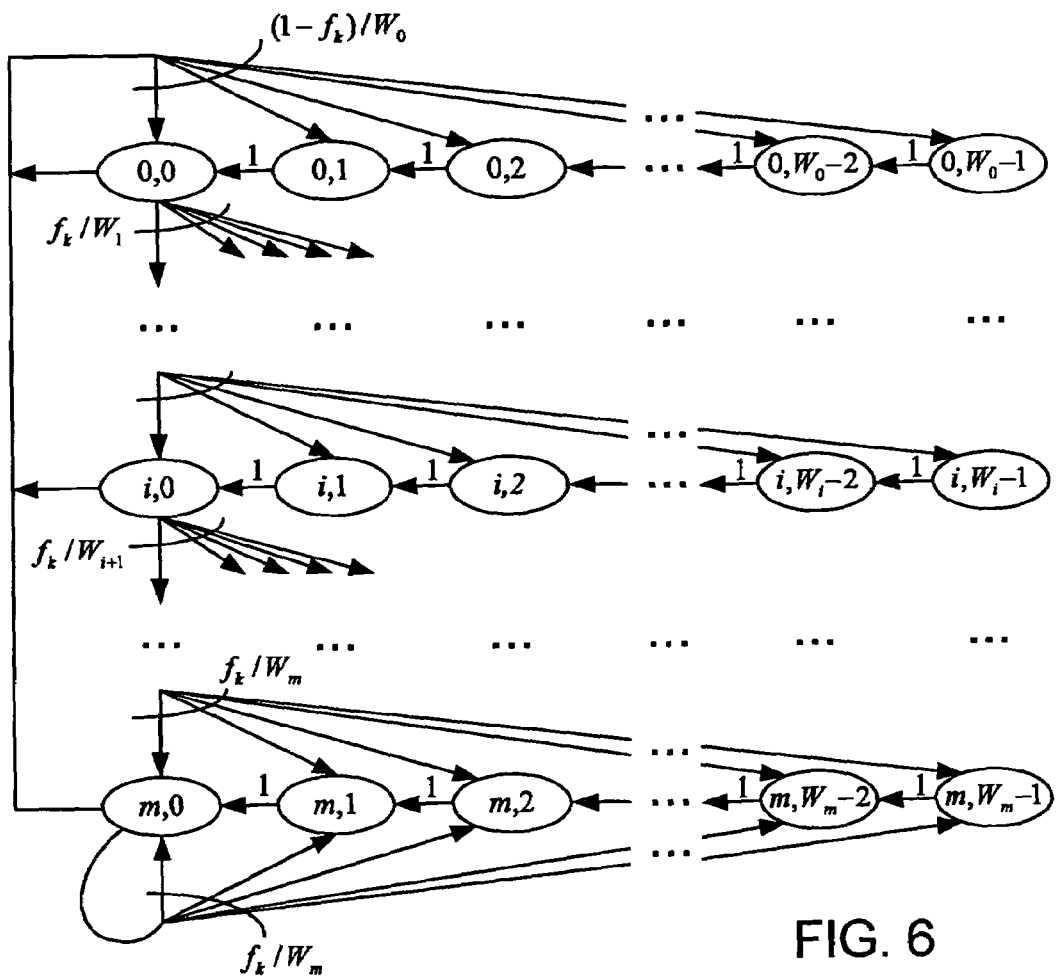
FIG. 6 is a diagram representing a Markov chain of state transitions related to the number of times of packet re-transmissions, and the number of remaining slots until transmission of a backoff timer.

Attention is paid only to a time point at which the number of remaining slots changes before the transmission of the backoff timer at a particular station. The state of the station at that time is defined by (i, j), where i represents the number of times of re-transmission of a current packet (i=0 for the first transmission), and j represents the number of remaining slots until the transmission of the backoff timer. With this definition, the state transition can be represented by a Markov chain as illustrated in FIG. 6. The representation of the state transition by the Markov chain in this manner is described in the aforementioned article by the present inventors. Solving a stationary solution of the Markov chain, the probability that the particular station transmits in an arbitrary slot is calculated as follows:

$$\tau_k = \sum_{i=0}^{m} P_{i,0}^k = \frac{2(1-2f_k)}{(1-2f_k)(W+1) + f_k W [1-(2f_k)^m]}, \quad (3)$$
$$0 \leq k \leq K$$

On the other hand, collision probability c$_k$ is calculated from {τ$_k$} as follows:

$$c_k = 1 - \frac{1}{1-\tau_k} \prod_{l=0}^{K} (1-\tau_l)^{n_l}, \quad 0 \leq k \leq K \quad (4)$$

Combining Equations (2) and (4), the resulting f$_k$ is expressed by:

$$f_k = 1 - \frac{1}{1-\tau_k} \prod_{l=0}^{K} (1-\tau_l)^{n_l} + \frac{e_k}{1-\tau_k} \prod_{l=0}^{K} (1-\tau_l)^{n_l}, \quad (5)$$
$$0 \leq k \leq K$$

At step 407, probability calculator 21 solves simultaneous equations composed of Equations (3) and (5) to find post-transmission failure probability f$_k$ and transmission probability τ$_k$. These post-transmission failure probability f$_k$ and transmission probability τ$_k$ may be calculated by, for example, an iteration method as described below.

When the calculation based on the iteration method is carried out, a table for storing a previously calculated value of f$_k$, a table for storing a previously calculated value of τ$_k$, a table for storing the last calculated value of f$_k$ and a table for storing the last calculated value of τ$_k$ are provided within probability calculator 21 for calculating probabilities f$_k$, τ$_k$. Each table stores values of f$_k$ or τ$_k$ for every k which satisfies 1≦k≦K. Here, for purposes of explanation, values of f$_k$, τ$_k$ which have been calculated in advance are represented by f$_{k\_old}$, τ$_{k\_old}$, respectively.

Upon the calculation of values of f$_k$, τ$_k$, the initial value is stored in each table of f$_k$, τ$_k$, f$_{k\_old}$, and τ$_{k\_old}$ in step #1. Then, f$_k$ is read out from the table and substituted into Equation (3) to calculate τ$_k$, and the calculated value of τ$_k$ is written in the table of τ$_k$ at step #2. In step #3, τ$_k$ is read from the table and substituted into Equation (5) to calculate f$_k$, and the calculated value of f$_k$ is written into the table of f$_k$.

The values of f$_k$ and f$_{k\_old}$ are compared to each other, the values of τ$_k$ and τ$_{k\_old}$ are compared to each other, and then the absolute values of differences obtained by these comparisons are compared to a predetermined value for all values of f$_k$, τ$_k$ satisfying 1≦k≦K in step #4. The predetermined value is used for judging whether the iteration calculation has converged or not. If each of the absolute values of the differences for all values of f$_k$, τ$_k$ is smaller than the predetermined value, the iteration calculation for f$_k$, τ$_k$ is then terminated, otherwise the contents of the table of f$_k$ are copied to the table of f$_{k\_old}$ and the contents of the table of τ$_k$ are copied to the table of τ$_{k\_old}$, and then the process goes back to step #2 with changing the values f$_k$, τ$_k$ in the tables of f$_k$, τ$_k$ in accordance with the above differences.

After post-transmission failure probability f$_k$ and transmission probability τ$_k$ are calculated, probability calculator 21 sends calculated probabilities f$_k$, τ$_k$ to evaluated value calculator 22. Probability calculator 21 also sends K, n$_k$, r$_k$, e$_k$, σ, m, W, Z, DIFS and SIFS to evaluated value calculator 22. Further, probability calculator 21 sends collision probability c$_k$ to evaluated value calculator 22 in order to calculate packet transmission delay.

Next, at step 408, evaluated value calculator 22 defines parameters τ, π$_k$, α$_k$, β$_k$, γ for convenience of calculating the throughput, and evaluates these parameters.

Parameter τ represents the probability that at least one or more stations transmit in an arbitrary slot, and is expressed by:

$$\tau = 1 - \prod_{k=0}^{K} (1 - \tau_k)^{n_k} \tag{6}$$

Parameter $\pi_k$ represents the probability that a particular station in group k successfully transmits in an arbitrary slot, and is expressed by:

$$\pi_k = \frac{\tau_k(1-e_k)}{1-\tau_k} \prod_{l=0}^{K} (1-\tau_l)^{n_l} \tag{7}$$

Parameters $\alpha_k$, $\beta_k$ represent average slot lengths when a station in group k successfully transmits and fails to transmit, respectively, and can be evaluated by the physical layer parameters $<<\sigma, m, W, DIFS, SIFS, Z>>$ (see the aforementioned articles by the present inventors).

When there is no transmission in a slot, the probability of such a situation is represented by $1-\tau$, and the time length of this slot is equal to $\sigma$.

When a transmission is successful in a slot, the transmission success probability of group k is represented by $n_k\pi_k$, and average slot length $\alpha_k$ in this event is expressed by:

$$\alpha_k = DIFS + SIFS + 2PHY + 2\delta + (2HPHY + HMAC + ACK + Z)/r_k$$

where PHY represents the physical layer overhead including a preamble and a PLCP header; HPHY represents remaining bits in the physical layer header and tail; HMAC represents the MAC layer header and FCS (frame check sequence) bits; $\delta$ represents a propagation delay; and ACK represents the length of a MAC layer ACK frame.

While a station in one group k transmits in a slot, the transmission may fail due to an error in reception. The probability of such a transmission failure is represented by $n_k\pi_k e_k/(1-e_k)$, and an average slot length $\beta_k$ in this case is expressed by:

$$\beta_k = DIFS + PHY + \delta + (HPHY + HMAC + Z)/r_k$$

When a collision occurs due to transmissions made by two or more stations in a slot, the probability that $n_k^c$ stations from group k are involved in the collision is expressed by:

$$\prod_{k=0}^{K} \binom{n_k}{n_k^c} (\tau_k)^{n_k^c} (1-\tau_k)^{n_k - n_k^c} \tag{8}$$

The average slot length in this case is represented by:

$$\gamma(n_0^c, n_1^c, \ldots, n_K^c) = \max_{\{k | n_k^c > 0\}} \{\beta_k\} \tag{9}$$

It is understood from the foregoing that the throughput can be expressed as the ratio of the average number of bits successfully transmitted in an arbitrary slot to the average time length of the slot (note that since a slot involving transmission includes such times as a transmission, DIFS and the like, the average time length of the slot is not equal to $\sigma$ which is a fixed length). In other words, the system throughput represented by S, and the throughput of an individual station in group k represented by $S_k$ are calculated by:

$$S = \frac{\left(Z \sum_{k=0}^{K} n_k \pi_k\right)}{(1-\tau)\sigma + \sum_{k=0}^{K} n_k \pi_k \sigma_k + \sum_{k=0}^{K} \frac{n_k \pi_k e_k}{1-e_k} \beta_k +}$$
$$\sum_{n_0^c + n_1^c + \ldots + n_K^c > 1} \gamma(n_0^c, n_1^c, \ldots, n_K^c) \prod_{k=0}^{K} \left[\binom{n_k}{n_k^c}(\tau_k)^{n_k^c}(1-\tau_k)^{n_k-n_k^c}\right] \tag{10}$$

$$S_k = \frac{\pi_k}{\sum_{l=0}^{K} n_l \pi_l} S \tag{11}$$

In Equation (10), Z represents an average packet size in bits. Since the throughput is calculated using parameters $\pi_k$, $\alpha_k$, $\beta_k$ or the like after these parameters have been calculated, evaluated value calculator 22 is provided with a table for storing values of $\pi_k$, $\alpha_k$, $\beta_k$ for all possible values of k. When the values of $\pi_k$, $\alpha_k$, $\beta_k$ are calculated, these calculated values are stored in the table. After that, these calculated values are read from the table upon the calculation of the throughput.

Next, the estimation procedure for packet transmission delay will be described. Assuming that $t_k$ is the packet transmission delay of a station in group k and $F_k(\chi) = P(t_k \leq \chi)$ is a distribution function of $t_k$. Laplace-Stieltjes transform (LST) $\phi_k = E[e^{-\theta t_k}]$ of distribution function $F_k(\chi)$ cam be represented as follows:

$$\phi_k(\theta) = \sum_{u=1}^{\infty} E\left[e^{-\theta(t_k^1 + t_k^2 + \ldots + t_k^u)}\right] P \tag{12}$$

(packet of group $k$ is successful at $u$-th transmission)

$$= \sum_{u=1}^{\infty} E\left[e^{-\theta(t_k^1 + t_k^2 + \ldots + t_k^u)}\right] f_k^{u-1}(1-f_k)$$

where $t_k^i$ is the packet transmission delay including a backoff of i-th transmission after (i−1) times of transmissions.

As illustrated in FIG. 6, if the standby of the i-th transmission starts from state (i, j) after the (i−1)-th transmission failure, the possibility of this is represented by $1/W_{i-1}$, and j pieces of slots are required until the transmission. If the time period necessary for the transition from state (i, j) to state (i, j−1) is represented by $v_k^j$, the LST of the distribution function is represented by:

$$E\left[e^{-\theta t_k^i}\right] = \sum_{j=0}^{W_{i-1}-1} \frac{1}{W_{i-1}} E\left[e^{-\theta(v_k^0 + v_k^1 + \ldots + v_k^j)}\right] \tag{13}$$

where $W_i = W_m (i > m)$

As described above, $v_k^j (j \geq 1)$ for a certain slot depends whether transmission to the slot from other stations exists or not. The probability that there is no transmission from other stations is represented by $1-c_k$, and $v_k^j$ is zero in such a case. The probability that there is transmission from other stations is represented by $c_k$. In such a case, $v_k^j$ is one of $\alpha$, $\beta$ and $\gamma$. Since there are no significant differences among parameters α, β and γ when comparing the case of σ, parameter α is used here for approximate estimation of $v_k^j$ for convenience. As a result, Equation (14) is obtained.

$$E\left[e^{-\theta v_k^j}\right] = (1-c_k)e^{-\theta\sigma} + c_k\exp\left(-\theta\frac{\sum_{l=1}^{K}(n_l-\omega_{lk})\tau_l\alpha_l}{\sum_{l=1}^{K}(n_l-\omega_{lk})\tau_l}\right), \quad (14)$$

$$j > 0$$

$$\text{where } \omega_{lk} = \begin{cases} 1, & l=k \\ 0, & l \neq k \end{cases}$$

For j=0, Equation (15) stands.

$$E[e^{-\theta v_k^0}] = e^{-\theta\alpha_k} \quad (15)$$

From Equations (13), (14) and (15), the following equation is obtained.

$$E\left[e^{-\theta t_k^j}\right] = \quad (16)$$

$$\sum_{j=0}^{W_{i-1}-1}\frac{1}{W_{i-1}}e^{-\theta\alpha_k}\left[(1-c_k)e^{-\theta\sigma}+c_k\exp\left(-\theta\frac{\sum_{l=1}^{K}(n_l-\omega_{lk})\tau_l\alpha_l}{\sum_{l=1}^{K}(n_l-\omega_{lk})\tau_l}\right)\right]^j$$

Equation (17) is obtained by substituting Equation (16) into Equation (12).

$$\phi_k(\theta) = \sum_{u=1}^{\infty} f_k^{u-1}(1-f_k)\prod_{i=1}^{u}\left[\sum_{j=0}^{W_{i-1}-1}\frac{1}{W_{i-1}}\right. \quad (17)$$

$$\left. e^{-\theta\alpha_k}\left[(1-c_k)e^{-\theta\sigma}+c_k\exp\left(-\theta\frac{\sum_{l=1}^{K}(n_l-\omega_{lk})\tau_l\alpha_l}{\sum_{l=1}^{K}(n_l-\omega_{lk})\tau_l}\right)\right]^j\right]$$

As obvious from Equation (17), the inverse transform of the LST of distribution function $F_k(\chi)$ can be obtained by numerical calculations, and it is possible to evaluate the packet transmission delay. The details why the numerical calculation can give the inverse transform of the LST is explained in, for example, C. Cunha, F. Viloche, "An Iterative Method for the Numerical Inversion of Laplace Transforms," Mathematics of Computation, Vol. 64, No. 211, pp. 1193-1198, July, 1995.

Assuming that a predetermined limit of delay is represented by T, the probability that the packet transmission delay excesses T is given by Equation (18).

$$P(t_k > T) = 1 - F_k(T) \quad (18)$$

Since the packet transmission delay excess probability is calculated by using values $\omega_{1k}$ or the like after these values are calculated, evaluated value calculator 22 is provided with a table for storing values $\omega_{1k}$ for all possible values of k. When the each value of $\omega_{1k}$ is calculated, the calculated value is stored in the table. After that, the calculated value is read from the table upon the calculation of the throughput.

In step 409, evaluated value calculator 22 determines throughputs S, $S_k$ and packet transmission delay probability $P(t_k > T)$ in the foregoing manner.

Finally, at step 410, output device 30 displays the results of calculations expressed by Equations (10), (11), (17) and (18).

In this way, according to this embodiment, the wireless LAN evaluation apparatus can find the performance provided by a wireless LAN system, which is constructed in future, such as the throughput and the packet transmission delay, even prior to the construction of the wireless LAN system. Thus, the wireless LAN evaluation apparatus facilitates efficient designing of a wireless LAN system, and installation of access points and terminals in the wireless LAN system. In addition, since the method used in this embodiment takes into consideration the probability of collisions among a plurality of terminals as well as the transmission/reception error rate associated with the radio conditions of the respective terminals, and is based on mathematical approaches such as Markov analysis, the throughput and the packet transmission delay can be accurately evaluated. Of course, evaluated value calculator 22 can be only one of the throughput and the packet transmission delay probability, as needed.

Next, another embodiment of the present invention will be described with reference to FIGS. 7 and 8.

Figure 5:
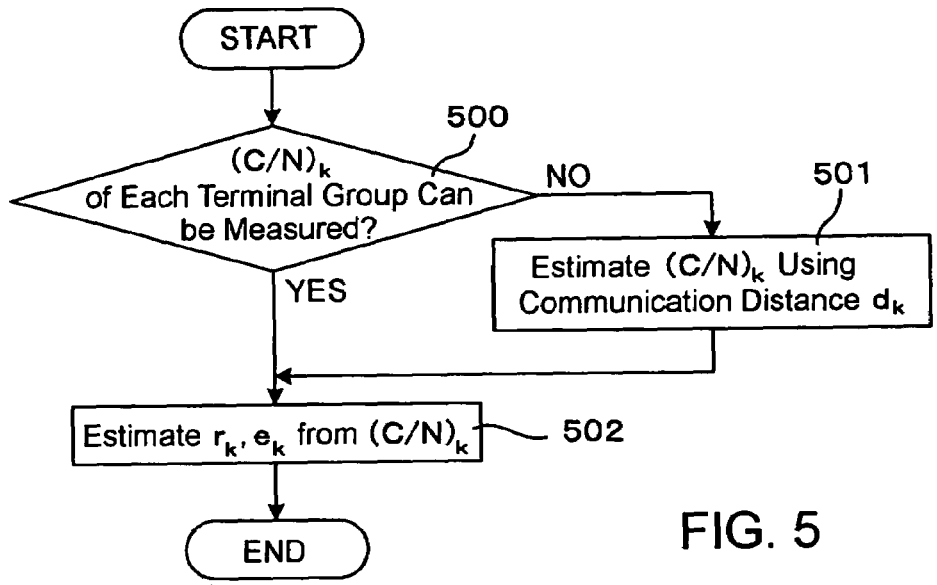
FIG. 5 is a flow chart illustrating a procedure for estimating parameters $r_k$, $e_k$.

In the foregoing description, when transmission rate $r_k$ and error rate $e_k$ cannot be directly supplied as shown at step 404 in FIG. 4 and in FIG. 5, input preparation unit 50 can be provided for estimating $r_k$, $e_k$. FIGS. 7 and 8 each illustrate the configuration of a wireless LAN evaluation apparatus which comprises such input preparation unit 50. Input preparation unit 50 then supplies estimated transmission rate $r_k$ and estimated error rate $e_k$ to transmission rate input unit 12 and error rate input unit 13, respectively.

Figure 7:
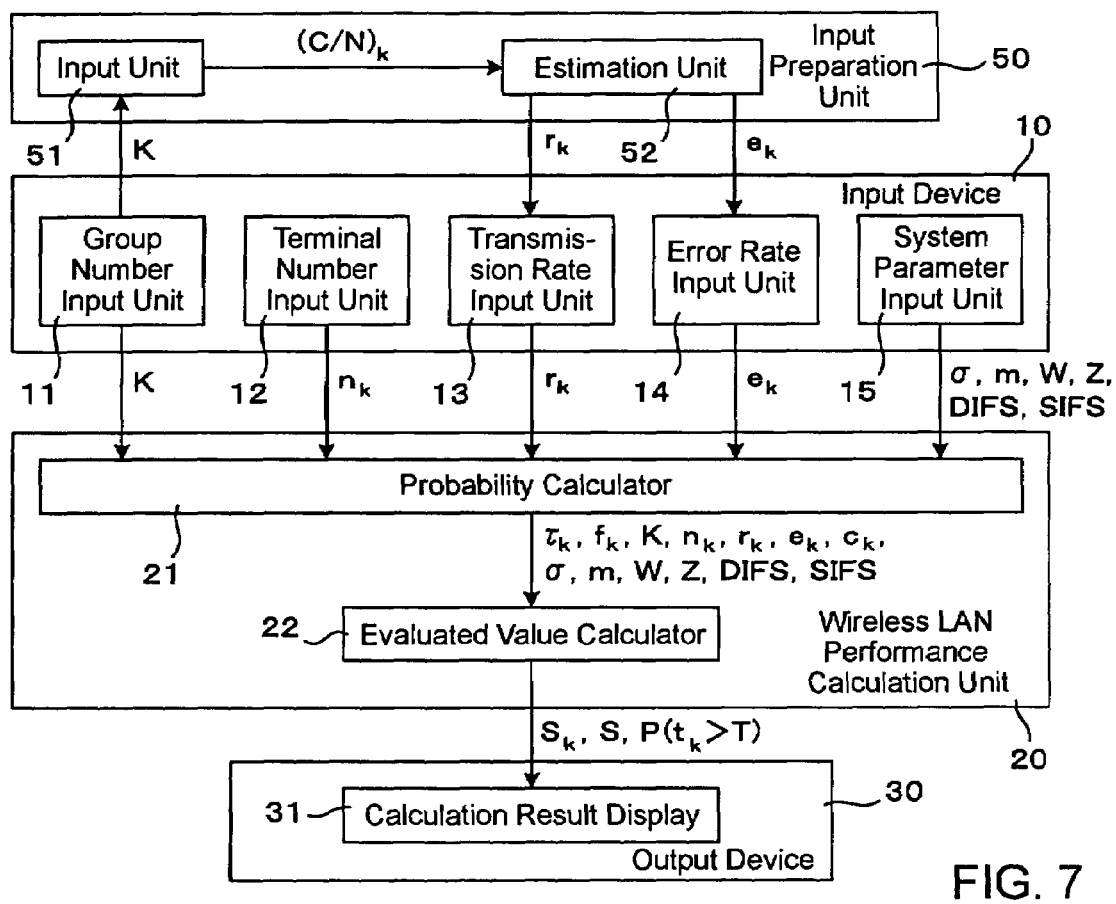
FIG. 7 is a block diagram illustrating the configuration of a wireless LAN evaluation apparatus according to another embodiment of the present invention.

FIG. 7 illustrates the configuration of the wireless LAN evaluation apparatus when a radio measuring instrument can be used to measure signal-to-noise ratio $(C/N)_k$. In this scenario, input preparation unit 50 may comprise an input unit 51 through which signal-to-noise ratio $(C/N)_k$ is entered, as measured for each group k, and estimation unit 52 for calculating transmission rate $r_k$ and error rate $e_k$ from $(C/N)_k$. Here, $(C/N)_k$ is entered through input unit 51, and estimation unit 52 estimates $r_k$, $e_k$ in accordance with the aforementioned step 502.

Figure 8:
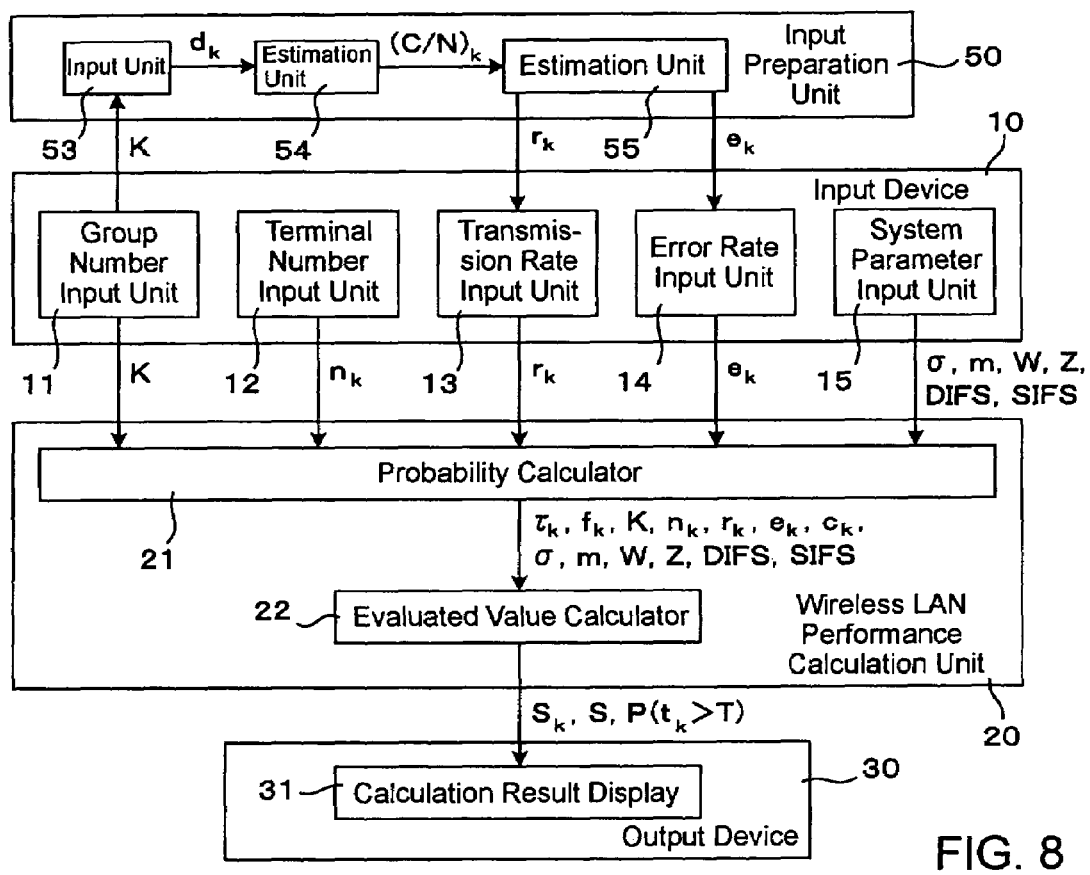
FIG. 8 is a block diagram illustrating the configuration of a wireless LAN evaluation apparatus according to a further embodiment of the present invention.

FIG. 8 illustrates the configuration of the wireless LAN evaluation apparatus when signal-to-noise ratio $(C/N)_k$ cannot be measured. In this scenario, input preparation unit 50 may comprise input unit 53 through which entered is distance $d_k$ from each terminal group to the access point; first estimation unit 54 for estimating $(C/N)_k$ on a group-by-group basis from the entered communication distance between the access point and terminal; and second estimation unit 55 for calculating transmission rate $r_k$ and error rate $e_k$ using estimated $(C/N)_k$.

As one application of the present invention, an ex-ante assessment service for evaluating performance of a wireless LAN can be provided to a customer who projects to settle the wireless LAN in future.

While preferred embodiments of the present invention have been described using specific terms, such description is for illustrative purposes only, and it is to be understood that changes and variations may be made without departing from the spirit or scope of the following claims.

What is claimed is:

1. A method for evaluating a performance of a wireless LAN system having a single access point and a plurality of transmission terminals, said access point and said transmission terminals sharing a same radio channel, said method comprising:
dividing said plurality of transmission terminals into groups in accordance with radio conditions;
calculating a transmission probability and a post-transmission failure probability for each group using a transmission rate, an error rate, and the number of terminals of said each group; and
transmitting the calculated transmission probability and the post-transmission failure probability to an output device.

2. The method according to claim 1, further comprising calculating a throughput based on said transmission probability and said post-transmission failure probability.

3. The method according to claim 1, further comprising calculating a characteristic value about packet transmission delay based on said transmission probability and said post-transmission failure probability.

4. The method according to claim 1, wherein said transmission rate and said error rate used in the calculations are actually measured for each group.

5. The method according to claim 1, further comprising calculating said transmission rate and said error rate from a signal-to-noise ratio which is actually measured for each group with said access point being installed.

6. The method according to claim 1 further comprising estimating said transmission rate and said error rate in accordance with a distance from said access point to a location at which a terminal in said each group is installed.

7. The method according to claim 2, wherein said transmission rate and said error rate used in the calculations are actually measured for each group.

8. The method according to claim 2, further comprising calculating said transmission rate and said error rate from a signal-to-noise ratio which is actually measured for each group with said access point being installed.

9. The method according to claim 2 further comprising estimating said transmission rate and said error rate in accordance with a distance from said access point to a location at which a terminal in said each group is installed.

10. The method according to claim 2, further comprising calculating a characteristic value about packet transmission delay based on said transmission probability and said post-transmission failure probability.

11. A method for evaluating a performance of a wireless LAN system having a single access point and a plurality of transmission terminals, said access point and said transmission terminals sharing a same radio channel, said method comprising:
dividing said plurality of transmission terminals into groups in accordance with radio conditions;
an input device supplying a probability calculator with a number of the groups, a number of terminals in each group, a transmission rate of each group, an error rate for each group, and a system parameter;
the probability calculator calculating a transmission probability and a post-transmission failure probability for each group using the system parameter, the transmission rate of said each group, the error rate for said each group, and the number of terminals in said each group; and
transmitting the calculated transmission probability and the post-transmission failure probability to an output device,
wherein said input device comprises: a group number input unit for entering the number of said groups; a terminal number input unit for entering the number of terminals in said each group; an transmission rate input unit for entering the transmission rate for said each group; an error rate input unit for entering the error rate for said each group; and system parameter input unit for entering the system parameter.

12. The method according to claim 11, further comprising:
an evaluated value calculator calculating a throughput and/or a characteristic value about packet transmission delay, based on said transmission probability and said post-transmission failure probability.

13. The method according to claim 11, further comprising:
an input preparation unit calculating the transmission rate and error rate for said each group based on a signal-to-noise ratio which is actually measured for said each group with said access point being installed; and
said input preparation unit supplying said transmission rate input unit and said error rate input unit with the calculated transmission rate and the calculated error rate, respectively.

14. The method according to claim 11, further comprising:
an input preparation unit calculating the transmission rate and error rate for said each group in accordance with a distance from said access point to a location at which a terminal in said each group is installed; and
said input preparation unit supplying said transmission rate input unit and said error rate input unit with the calculated transmission rate and the calculated error rate, respectively.

15. An apparatus for evaluating a performance of a wireless LAN system having a single access point and a plurality of transmission terminals, said access point and said transmission terminals sharing a same radio channel, said system comprising:
means for entering a transmission rate, an error rate, and the number of terminals of each of groups into which said plurality of transmission terminals are divided in accordance with radio conditions;
means for calculating a transmission probability and a post-transmission failure probability for each group using said transmission rate, said error rate, and said number of terminals of each group; and
means for outputting the calculated transmission probability and the post-transmission failure probability.

16. The apparatus according to claim 15, further comprising means for calculating a throughput based on said transmission probability and said post-transmission failure probability.

17. The apparatus according to claim 15, further comprising means for calculating a characteristic value about packet transmission delay based on said transmission probability and said post-transmission failure probability.

18. The apparatus according to claim 15, further comprising:
means for entering a signal-to-noise ratio actually measured for each group with said access point being installed; and
means for calculating said transmission rate and said error rate from said signal-to-noise ratio.

19. The apparatus according to claim 15, further comprising:
means for entering a distance from said access point to a location at which a terminal in said each group is installed; and
means for estimating said transmission rate and said error rate in accordance with the distance.

20. The apparatus according to claim 16, further comprising:

means for entering a signal-to-noise ratio actually measured for each group with said access point being installed; and means for calculating said transmission rate and said error rate from said signal-to-noise ratio.

21. The apparatus according to claim 16, further comprising:

means for entering a distance from said access point to a location at which a terminal in said each group is installed; and means for estimating said transmission rate and said error rate in accordance with the distance.

22. The apparatus according to claim 16, further comprising means for calculating a characteristic value amount packet transmission delay based on said transmission probability and said post transmission failure probability.

23. The method according to claim 1, wherein the transmission probability and the post-transmission failure probability are calculated using an iteration method.

* * * * *